March 24, 1953 B. S. VILKOMERSON ET AL 2,632,802

KEYED AUTOMATIC GAIN CONTROL AND SYNCHRONIZING SIGNAL SEPARATOR

Filed Oct. 29, 1949

Inventors
BENJAMIN S. VILKOMERSON
AND CLYDE W. HOYT

By Olin O. Mitchell
Attorney

Patented Mar. 24, 1953

2,632,802

UNITED STATES PATENT OFFICE 2,632,802

KEYED AUTOMATIC GAIN CONTROL AND SYNCHRONIZING SIGNAL SEPARATOR

Benjamin S. Vilkomerson, Camden, and Clyde W. Hoyt, Pennsauken Township, Camden County, N. J., assignors to Radio Corporation of America, a corporation of Delaware Application October 29, 1949, Serial No. 124,416

12 Claims. (Cl. 178—7.3)

Figure 1:
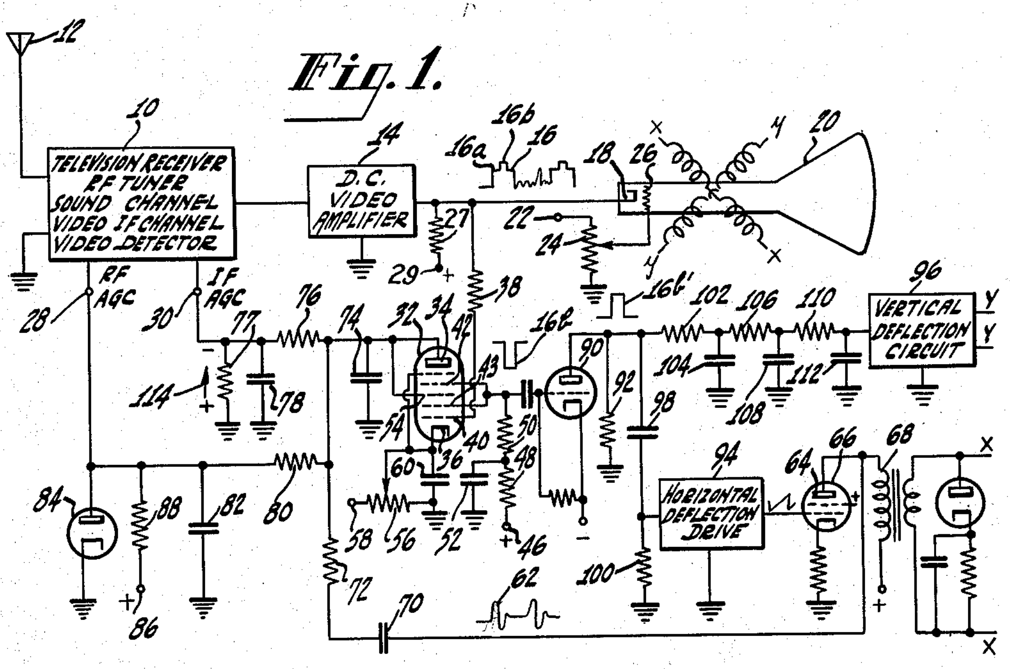

The present invention relates to an improved form of combination automatic gain control circuit and amplitude discriminatory circuit for radio receiving equipment.

With more particularity, although not necessarily exclusively, the present invention deals with an improved form of electrical circuit for achieving automatic gain control and sync clipping in present day television receiving arrangements. Even more directly, the present invention is involved with a combination keyed automatic gain control circuit and sync clipping circuit for use in television receivers.

In the radio communication art and in particular, that phase of the art dealing with the transmission and reception of television signal information, it is quite well known that it becomes desirable to supply the receiving equipment with some form of automatic gain control circuit whereby the brilliance and contrast of the reproduced picture is rendered less dependent upon received signal strength. Furthermore, in all television receiving circuits adapted to receive and utilize the present standard composite television signal, it is necessary to provide some form of amplitude discriminatory circuit which will separate relatively high amplitude sync pulses of the composite signal from the remaining lower amplitude portions of the signal. After having been clipped from the composite signal, the sync signals are then applied to the television receiver deflection circuits for timing thereof.

In order to achieve the above-mentioned circuit actions, namely automatic gain control and signal clipping in television receivers, numerous circuit arrangements have been proposed. For instance, in the case of automatic gain control arrangements, circuits are quite well known for producing a gain control potential in accordance with peak detection of the incoming signal, which type of system is relatively vulnerable to noise bursts and rapid signal fading or flutter. To overcome these disadvantages, automatic gain control circuits of the "keyed" variety were developed wherein the incoming signal was sampled only during predetermined time intervals, usually corresponding to the composite signal synchronizing level or blanking level. Since the keyed type of automatic gain control potential is developed only in accordance with information sampled from the incoming signal at these predetermined intervals, the immunity of the control potential to noise bursts is greatly increased. Unfortunately, however, the keyed type automatic gain control circuit complexities represent additional circuit cost.

Furthermore, in the attempt to combine a plurality of circuit functions into circuits requiring but a few tubes it has generally been found possible to produce combination type automatic gain control and sync clipping circuits, the gain control circuit not, however, being of the keyed variety. Thus, one of the considerations in television circuit organization becomes the provision of some form of keyed automatic gain control circuit which will additionally provide suitable amplitude discrimination for purposes of sync clipping.

Moreover, in all types of sync clipping circuits, it is desirable that the clipped sync information have as sharp and steep a waveform as possible, thereby to enhance the accuracy of deflection circuit timing.

It is, therefore, the purpose of the present invention to provide an improved form of combination automatic gain control circuit and amplitude discriminatory circuit for radio receiving equipment.

It is another object of the present invention to provide a new or improved form of keyed automatic gain control circuit which also provides sync clipping action in present day television receiving circuits.

A still further object of the present invention resides in the provision of a sync clipping circuit for television receivers which produces exceptionally steep waveform sync separation.

It is further well known that some automatic gain control circuits for radio receivers generally exhibit some time delay in their action. That is to say, some nominal time period is required for the circuit to fully act in compensating for a change in received signal level. This automatic gain control delay is particularly disadvantageous in television receiver circuits using a simple gate type arrangement for sync clipping. With such simple gate circuits, a momentary increase in signal strength may cause the gate circuit to accept and pass video information well below the sync pedestal level and thereby cause mis-synchronization of the deflection circuits.

It is therefore another object of the present invention to provide a new and improved sync clipping circuit for television receivers which automatically immunizes itself against the passing of substantial signal information upon the receipt of large amplitude radio carriers.

In the realization of the above objects and advantages, the present invention in its more general form contemplates the use of a multicontrol electrode electron tube having substantially no static polarizing potential applied to its anode but having moderate polarizing potential applied to its screen electrode. Bias is then applied to a control electrode to establish static cutoff of the screen current. Applied video signals having sync positive polarity may then be applied to a control electrode to establish screen current conduction only during sync peaks thereby allowing separated sync to appear at the screen electrode of the tube. Positive going timing pulses are then applied to the anode of the electron tube, the timing pulses being, in turn, synchronized with the received sync pulses to produce anode-cathode current during reception of sync. By placing a suitable time constant in the anode circuit, an automatic gain control potential may then be developed which is of a negative polarity and suitable for direct application to the control electrodes of vacuum tube amplifiers handling incoming video signals.

Other objects and advantages of the present invention in addition to those set forth hereinabove, as well as a more complete understanding of its operating mode, will become apparent to those skilled in the art upon perusal of the following specification, especially when taken in connection with the accompanying drawing.

Turning now to Figure 1, there is indicated in block 10 some of the typical components of a present day television receiver, namely, an R. F. tuner, a sound channel, a video I. F. channel and a video detector. Accordingly, signals intercepted by the antenna 12 are amplified, heterodyned and demodulated by the video detector and applied to some form of video amplifier, such as indicated in block 14. For purposes of illustration, we shall assume the signal appearing at the output of D.-C. amplifier 14 is polarized in the sync positive direction as indicated by the waveform 16. This permits the video signal 16 to be directly applied to the cathode 18 of the cathode ray kinescope 20 for modulation of the electron beam thereof. Any form of brightness control may be used in the connection with the kinescope 20, that indicated by the voltage source 22 and potentiometer 24 in connection with the grid 26 being only exemplary. The cathode of kinescope 18 is seen to be further connected through resistance 27 to some positive bias source terminal 29. This is indicated only for purposes of illustrating the necessary D.-C. consideration which will hereinafter be entertained. As is quite common in television receiver design, the R. F. and I. F. stages of block 10 are provided with automatic gain control potential terminals, respectively indicated at 28 and 30. It is to these terminals that automatic gain control potential may be applied regardless of its mode of development, for adjusting the gain of the R. F. channels and video I. F. channels.

The automatic gain control circuit for developing the gain control potential for application to the terminals 28 and 30, in accordance with the present invention, comprises a vacuum tube 32 having an anode 34, a cathode 36 and a plurality of control electrodes. By way of example, the vacuum tube 32 has been illustrated as being of the pentagrid converter type, of which the commercial type 6BE6 is quite representative. The positive going video signal 16 is then applied through resistor 38 to the signal grid 40 of the vacuum tube 32. The screen grids 42 and 43 are connected together and thence to a positive biasing potential terminal 46 through resistors 48 and 50. Capacitor 52 acts in conjunction with resistor 48 to form a special type of compensating circuit whose purpose is to be hereinafter described. The insertion grid 54 of the converter type tube 32 is shown connected with the anode 34.

In further accordance with the present invention, cathode 36 of the vacuum tube 32 may be adjusted in potential by means of the potentiometer 56 connected between the power supply potential available between terminal 58 and ground. Any resistance of the potentiometer 56 inserted in the cathode circuit of the vacuum 32 is suitably bypassed by the capacitor 60. In order to establish periodic conduction in the vacuum tube 32 for purposes of automatic gain control sampling, positive going pulses 62 are extracted from the anode 64 of the deflection output tube 66. As well known by those skilled in the art, these pulses 62 correspond to the first half cycle of free resonance in the transformer 68 during the return time of the deflection cycle. The pulses 62 are coupled through capacitor 70 and resistor 72 to the anode 34. This capacitor-resistor combination both attenuates the amplitude of the pulses so applied to the anode and blocks the D.-C. component appearing at the deflection output tube anode. For reasons hereinafter described, the timing or keying pulses 62 are integrated by means of capacitor 74 in their application to the anode 34. The automatic gain control potential thereby developed at the anode 34 is suitably filtered by means of resistance 76 and capacitor 78 for application to the I. F. automatic gain control potential 30 while being filtered by resistance 80 and capacitor 82 for application to the I. F. automatic gain control terminal 28. A diode 84 acts to prevent the R. F. automatic gain control terminal 28 from going positive with respect to ground during no-signal conditions, the terminal 28 being, as shown, connected to a source of positive potential 86 through resistor 88.

In the operation of the embodiment of Figure 1 according to the present invention, the static grid cathode bias on the vacuum tube 32 is adjusted by means of the potentiometer 56 and the choice of value of resistance 27 to establish current cutoff in the screen electrodes 42 and 43 and thereby through the resistance elements 48 and 50. The value of the cutoff bias so applied is further adjusted to permit electron conduction through the load resistors 48 and 50 only for signal amplitudes in excess of the blanking level $16_a$ of the video signal 16. This will then allow the sync pulses $16_b$ to appear in a negative going direction across the screen load resistor 48 for application to the control electrode of the sync amplifier tube 90. The anode load impedance 92 of the sync amplifier tube 90 will then evidence positive going sync pulses $16_b$ across its terminals which pulses are suitable for conventional synchronization of the horizontal and vertical deflection circuits 94 and 96, respectively. The horizontal sync pulses appearing at the output of the sync amplifiers 90 will, of course, be differentiated by means of capacitor 98 and resistor 100, while the vertical synchronizing pulses will be conventionally integrated by the integrating network 102, 104, 106, 108, 110 and 112.

The flyback or timing pulses 62 applied to the anode 34 of the vacuum tube 32 will then be in synchronism with the incoming horizontal synchronizing pulses and, if properly adjusted in amplitude by proportioning resistor 72 in relation to other circuit impedances, the anode 34 of the vacuum tube can be made to swing sufficiently positive to produce anode-cathode current flow during the reception of sync pulses. It is to be understood that the capacitor 74 is preferably made sufficiently large to integrate the pulses 62 so that the positive swing of the anode 34 continues for a period well in excess of a sync pulse width. Therefore, the actual conduction period in the anode circuit of the vacuum tube 32 will be substantially a sole function of the duration of the sync pulse $16_b$, for intervals between vertical sync pulses, while being rendered a function of the duration of the actual integrated timing pulse applied to the anode 34 during the vertical sync pulse intervals. This latter effect will be slightly altered, of course, by merit of the serrations in the present day standard vertical sync pulses.

Nevertheless, the amplitude of current flow in the anode circuit during the sync intervals will be rendered a direct function of the amplitude of the received signal since the video signal 16 applied to the signal grid 40 of the vacuum tube is direct-current coupled thereto. Thus, conventional current flow in the direction indicated by the arrow 114 through resistors 76 and 77 will produce a negative potential with respect to ground at the anode 34. The magnitude of the negative potential will, of course, be directly proportional to the received signal strength and may be, after suitable filtering, used directly as an automatic gain control potential. For example, a decrease in the received signal strength will lower the instantaneous positive level of the grid 40 during the sync interval and will, therefore, reduce the current flow through the resistors 76 and 77 during the timing or keying pulses 62. This will render the anode 34 less negative or more positive. This positive trend of the anode will be conveyed through the filter circuit 76—78 and filter circuit 80—82 to the respective automatic gain control terminals 28 and 30 to increase the gain of the receiver and thereby compensate for the reduction in received signal strength.

As is conventional practice, the R. F. automatic gain control terminal 28 is supplied with a generally more positive control potential than the I. F. automatic gain control terminal 30. This is accomplished by means of the bleeder resistor 88 acting through the resistance to ground present at the automatic gain control terminal 28. The bias clamp tube 84 as above-described insures that the gain control bias applied to the R. F. stages shall never swing positive on low level signals.

It is important to notice that in the practice of the present invention, the connection of the insertion grid 54 of the vacuum tube 32 to the anode 34 thereof is not necessary, although sometimes highly desirable. By means of this connection, it is possible to render the amplitude of separated sync more independent of the actual value of automatic gain control anode-cathode current in the discharge tube. However, by connecting the insertion grid 54 directly to the screen grids 42 and 43 of the vacuum tube 32, it is possible to realize a slightly higher gain in the sync separation action. It is found important to note that, although it is preferable to provide a certain amount of integration or broadening of the keying pulse 62 applied to the anode 34, that such integration is not entirely necessary. In practice, it is desirable since it reduces the importance of the timing of the flyback pulse 62 being in exact occurrence with the received sync pulses $16_b$. It can be seen that were integration not provided, the occurrence of the timing or flyback pulse 62 at a time subsequent to the synchronizing pulse $16_b$ or at a time interval which would not be fully embraced by the synchronizing pulse $16_b$, would produce erroneous automatic gain control potential information. However, it will be understood that broadening of the timing pulse 62 does tend to reduce the noise immunity of the developed automatic gain control potential so that in practice, a compromise must be drawn between these two considerations.

Figure 2:
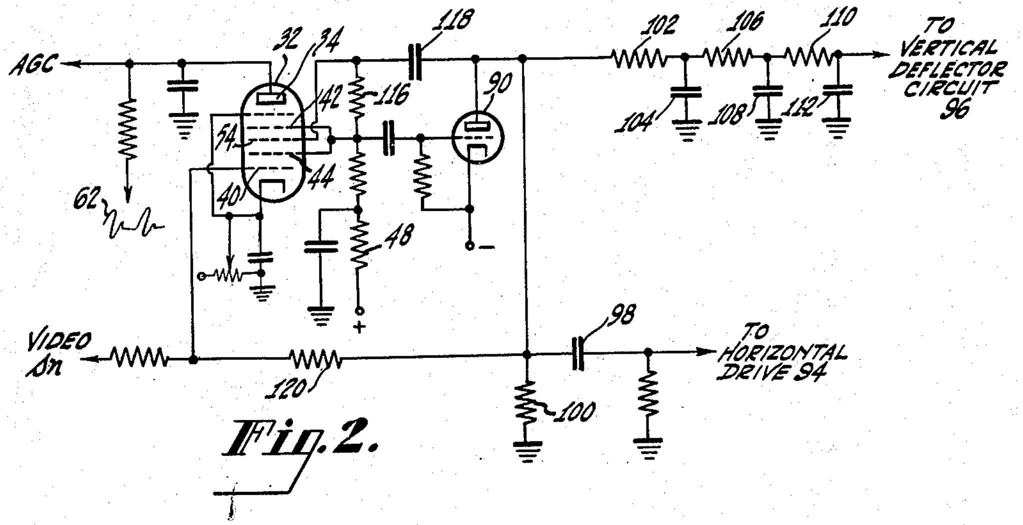

Another embodiment of the present invention is shown in Figure 2. This embodiment is substantially the same as shown in Figure 1 with the exception of a few novel techniques which, in some instances, act to improve the waveform of the separated sync. For purposes of simplicity, circuit elements in Figure 2 corresponding to those in Figure 1 have been given like numerical designations. It will be noticed, however, in Figure 2 that the insertion grid 54 instead of being connected with the anode 34 is connected with the screen electrodes 42 and 44 through resistor 116. The insertion grid is then supplied with the output of the sync amplifier 90 through capacitor 118. This produces a certain amount of regeneration which acts to sharpen or steepen the wave front of the separated synchronizing pulses. If desired, even more feedback may be applied by the resistor 120 connected between the anode of the sync amplifier 90 and the signal grid 40 of the vacuum tube 32. Care must be exercised in the use of the regeneration to maintain sufficient stability so that shock excitation of the circuit will not produce sustained or damped oscillation. However, by properly balancing the degree of feedback, the sync separation action may be improved as well as improving the effective automatic gain control circuit gain and, thereby its ability to maintain the demodulated signal level at a constant amplitude.

It is manifest that, although the regenerative feedback of the sync amplifier and automatic gain control circuit shown herein has been applied to a specific circuit configuration, its advantages and operation are in no way limited thereto. Controlled regeneration of this character will, of course, find use in other sync separating circuits as well as alternative forms of automatic gain control circuits.

As pointed out hereinbefore, gate type of sync clipping circuits to which the present invention may, in some respects, be considered similar, are particularly vulnerable to momentary increases in applied signal strength. For instance in the embodiments of Figure 1 and Figure 2, should the incoming signal, as intercepted by the antenna 12, increase to a very large value, the amplitude of the demodulated signal 16 applied to the vacuum tube 32 would also increase greatly. Since the bias between the grid 40 and cathode 36 would not instantaneously change, it will appear that the clipped output of the vacuum tube 32, appearing at the upper end of resistor 50, may well contain blanking pedestal as well as video information. This might cause the deflection generators 94 and 96 to falsely synchronize on components of the composite signal other than the synchronizing component $16_b$.

However, in further accordance with the present invention, mis-synchronization of the deflection circuit due to this effect is obviated by including the heretofore described resistor 48 and capacitor 52 in the voltage supply circuit for the screen electrodes 42 and 43 of vacuum tube 32. In practice, the resistance 48 is made quite high and the capacitor 52 made relatively large to form a very long time constant in excess of several television frame intervals. If the resistance 48 is made sufficiently high, the screen electrodes 42 and 43 will appear to be supplied from what may be called a constant current source of potential, the terminal of such source being considered the junction of resistors 48 and 50. Thus, when an incoming signal becomes of considerable amplitude, the grid 40 of the vacuum tube 32 will swing positively tending to cause more current to flow to the screen electrodes 42 and 43. Due to the high resistance 48, when this happens, the potential of screens 42 and 43 will drop to a very low value and under such conditions will be unable to swing to any great extent in accordance with information passed by the tube. As the grid 40 swings positively, the automatic gain control circuit will develop a more negative voltage at the terminals 28 and 30, thereby cutting down the video amplifier output to a more correct value. When this occurs, the grid 40 will become more negative with respect to ground thereby reducing the current to screens 42 and 43 and thus increase the positive potential of the screens. This will then allow the required large voltage swing across the resistor 50 to be utilized for the desired synchronization of the deflection circuits. Thus, it can be seen that one aspect of the present invention provides a sync clipping circuit which automatically immunizes itself against the application of excessively high signal amplitudes.

Although both of the embodiments of the present invention shown in Figure 1 and Figure 2 incorporate this novel immunizing circuit, it is clearly apparent that the value of the immunizing arrangement is in no way limited to the embodiment shown. By increasing the effective source impedance of polarizing potential for most any sync clipping circuit presently known in the art, the advantages of this aspect of the present invention could be realized.

In concluding, it is clear that, although the present invention has been illustrated in connection with a pentagrid type vacuum tube, its utility and application to other type tubes is fully contemplated. For example, although the mutual conductance of pentagrid converter type tubes is desirably high, tetrode, pentode or other multielement tubes could be successfully utilized in accordance with the present invention. Even more, it is further obvious that the source of keying or timing pulses for the vacuum tube 32 need not be confined to the horizontal deflection circuit nor do the character of the pulses utilized need necessarily conform to this type of pulse. For example, a suitable pulse generator may be embodied in the receiving circuit which is of sufficient duration and amplitude as to not need the integrating circuit 72—74 or the attenuation this circuit provides.

Finally, it is clearly manifest that the use of the particular sync amplifier shown in connection with the output of the sync separating action of the present invention is in no way critical; nor is the manner in which the developed automatic gain control potential communicated to the gain control potential requirements of the receiver signal amplifier circuits of great significance. In some cases where deflection circuits are of a nature requiring negatively poled synchronizing pulses, the sync amplifier 90 may be eliminated provided, of course, sufficient amplitude of the sync pulse is present. On the other hand, the gain control of the television receiver may be restricted to only the video I. F. amplifier or the R. F. amplifier, thereby not requiring the use of two separate automatic gain control potential filter and distribution circuits.

We claim:

1. In a radio receiver adapted to receive and demodulate a composite signal containing an intelligence component and a timing pulse component, the timing pulses representing a substantially constant peak percentage of radio carrier modulation, in combination, means for extracting demodulated composite signal from said receiver, an electron discharge tube having at least an anode, cathode, and first and second control electrodes, a conductive load path connected between the anode and cathode of said discharge tube, connections from said extracting means for applying demodulated composite signal to said first control electrode with a polarity causing positive-going excursions of said control electrode in response to said timing pulses, a source of keying pulses synchronously related to the received timing pulses, connections for applying said keying pulses to said conductive load path such to produce anode-cathode conduction therethrough substantially only during the interval of each keying pulse, resistive means in said conductive load path to develop a control voltage in accordance with the current therethrough and hence in accordance with the peak value of the received timing pulse applied to said first electrode, means for statically biasing said second control electrode, a load impedance serially connected with said second control electrode and said biasing means, and means for dynamically biasing said first electrode relative to said cathode such that current flow is established through said second control electrode load impedance only by peaks of said timing pulses.

2. Apparatus according to claim 1 wherein said receiver is provided with an automatic gain control voltage terminal and a utilization means for synchronization by said timing pulses, and wherein there is additionally provided means for coupling said load path control voltage to said automatic gain control voltage terminal, and means for coupling the second electrode extremity of said load impedance to the input of said timing pulse utilization means.

3. Apparatus according to claim 1 wherein said keying pulses, as active to produce current flow through said conductive load path, are of a duration in excess of the width of said timing pulses.

4. In a television receiving apparatus adapted to receive and demodulate a composite signal having a video component, a synchronizing pulse component and blanking component, said synchronizing pulses occurring during said blanking intervals and designated by a constant peak percentage of radio carrier modulation in excess of said blanking component, a combination synchronizing clipper and automatic gain control system comprising in combination, gain control means for controlling the gain of said receiver in accordance with a control potential, an electron discharge tube having at least an anode, cathode, and first and second control electrodes, a statically non-conductive load path connected between the anode and cathode of said discharge tube, a source of keying pulses synchronously related to the received synchronizing pulses, means for applying said keying pulses to said load path for producing anode-cathode conduction therethrough, time constant means connected in said load path for developing a gain control potential in accordance with average current flow therethrough, connections from said receiver to said discharge tube first control electrode for applying demodulated composite signal thereto, means including a series load impedance for statically biasing said second control electrode positively with respect to said cathode, means for dynamically biasing said first control electrode sufficiently negative relative to said cathode to permit current flow through said second electrode load impedance only for signal levels in excess of the composite signal blanking level applied to said first control electrode, such to produce voltage variations across said load impedance corresponding to said synchronizing pulses, a deflection generator for said television receiver, means for coupling said second control electrode load impedance voltage variations to said deflection generator for timing thereof, and connections applying said time constant gain control potential to said gain control means for automatic gain control of said receiver.

5. In a television receiving apparatus adapted to receive and demodulate a composite signal having a video component, a synchronizing pulse component and blanking component, said synchronizing pulses occurring during said blanking intervals and designated by a constant peak percentage of radio carrier modulation in excess of said blanking component, a combination synchronizing pulse clipper and automatic gain control system comprising in combination, an electron discharge tube having at least an anode, cathode, and first and second control electrodes, a source of keying pulses synchronously related to the received synchronizing pulses, said keying pulses being of greater duration than said synchronizing pulses, means for statically biasing said first control electrode to electron current cutoff in said tube, means for applying demodulated composite signal with the synchronizing pulse extending in a positive direction to said first control electrode with such amplitude to cause electron flow only during peaks of synchronizing pulses, positively polarized load means connected with said second control electrode for developing clipped synchronizing signals, a discharge tube anode-cathode circuit excited by said keying pulses for developing a control potential representative of received signal strength, means for applying said control potential for automatic gain control of said receiver, a deflection generator for said television receiver, and means for applying said clipped synchronizing signals to said deflection generator for timing control thereof, said clipped synchronizing signals applying means including at least a second electron discharge tube having a control electrode cathode and anode, a connection from said first discharge tube second control electrode to said second discharge tube control electrode, an anode-cathode load circuit for said second discharge tube, and means for coupling the output of said second tube load circuit to said first discharge tube first control electrode to obtain regenerative peaking of the clipped synchronizing signal information.

6. In a television receiving apparatus adapted to receive and demodulate a composite signal having a video component, a synchronizing pulse component and blanking component, said synchronizing pulses occurring during said blanking intervals and designated by a constant peak percentage of radio carrier modulation in excess of said blanking component, a combination synchronizing pulse clipper and automatic gain control system comprising in combination, an electron discharge tube of the pentagrid converter variety having a signal grid, an insertion grid, a screen grid structure on either side of said insertion grid, a suppressor grid, an anode and a cathode, a source of keying pulses synchronously related to the received synchronizing pulses, said keying pulses being of greater duration than said synchronizing pulses, means for statically biasing said signal grid to electron current cutoff in said tube, means for applying demodulated composite signal with the synchronizing pulse extending in a positive direction to said signal grid with such amplitude to cause electron flow only during peaks of synchronizing pulses, positively polarized load means connected with said screen grid structure for developing clipped synchronizing signals, a discharge tube anode-cathode circuit excited by said keying pulses for developing a control potential representative of received signal strength, means for applying said control potential for automatic gain control of said receiver, a deflection generator for said television receiver, and means for applying said clipped synchronizing signals to said deflection generator for timing control thereof, said clipped synchronizing signals applying means including at least a second electron discharge tube having a grid, cathode and anode, an anode-cathode circuit for said second discharge tube, and means for coupling the load circuit of said second discharge tube to said first tube insertion grid.

7. Apparatus according to claim 6 wherein there is further provided a resistor between said screen grid structure and said insertion grid of said first-named discharge tube.

8. In a television receiving apparatus adapted to receive and demodulate a composite signal having a video component, a synchronizing pulse component and blanking component, said synchronizing pulses occurring during said blanking intervals and designated by a constant peak percentage of radio carrier modulation in excess of said blanking component, a combination synchronizing pulse clipper and automatic gain control system comprising in combination, gain control means for controlling the gain of said receiver in accordance with a control potential, a pentagrid converter type electron discharge tube having at least a signal grid, insertion grid, screen grid, cathode and anode, a statically non-conductive load path connected between the anode and cathode of said discharge tube, a source of keying pulses synchronously related to the received synchronizing pulses, means for applying said keying pulses to said load path for producing anode-cathode conduction therethrough, time constant means connected in said load path for developing a gain control potential in accordance with average current flow therethrough, connections from said receiver to said discharge tube signal grid for applying demodulated composite signal thereto, means including a series load impedance for statically biasing said screen grid positively with respect to said cathode, means for biasing said signal electrode sufficiently negative relative to said cathode to permit current flow through said screen electrode load impedance only for signal levels in excess of the composite signal blanking level so as to produce synchronizing pulse voltage variations at said screen electrode, a deflection generator for said television receiver, means for coupling said screen electrode voltage variations to said deflection generator for timing thereof, and connections applying said time constant gain control potential to said gain control means for automatic gain control of said receiver.

9. Apparatus according to claim 8 wherein said insertion grid is directly connected to said screen grid.

10. Apparatus according to claim 8 wherein said insertion grid is directly connected to said discharge tube anode.

11. Apparatus according to claim 8 wherein said means for coupling said screen electrode voltage variations to said deflection generator embraces a second electron discharge tube having a grid, cathode and anode, with said grid being coupled to said first-named discharge tube screen electrode, an anode-cathode load circuit for said second discharge tube, and means for coupling the load circuit of said second discharge tube to said first tube insertion grid.

12. Apparatus according to claim 8 wherein said means for coupling said screen electrode voltage variations to said deflection generator embraces a second electron discharge tube having a grid, cathode and anode, with said grid being coupled to said first-named discharge tube screen electrode, an anode-cathode load circuit for said second discharge tube, and a resistance connected from the anode of said second discharge tube to the signal grid of said first discharge tube.

BENJAMIN S. VILKOMERSON.
CLYDE W. HOYT.

REFERENCES CITED

The following references are of record in the file of this patent:

UNITED STATES PATENTS

| Number | Name | Date |
|---|---|---|
| 2,197,900 | Schlesinger | Apr. 23, 1940 |
| 2,231,792 | Bingley | Feb. 11, 1941 |
| 2,289,291 | Moore | July 7, 1942 |
| 2,307,218 | Hardwick | Jan. 5, 1943 |
| 2,356,141 | Applegarth | Aug. 22, 1944 |
| 2,538,519 | Holst | Jan. 16, 1951 |
| 2,559,038 | Bass | July 3, 1951 |
| 2,566,763 | Fyler | Sept. 4, 1951 |

FOREIGN PATENTS

| Number | Country | Date |
|---|---|---|
| 377,439 | Italy | Dec. 16, 1939 |